United States Patent
Kawata et al.

(10) Patent No.: US 6,982,865 B2
(45) Date of Patent: Jan. 3, 2006

(54) SOLID ELECTROLYTIC CAPACITOR

(75) Inventors: Yohei Kawata, Hirakata (JP); Fumio Tatezono, Hirakata (JP); Seiji Omura, Daito (JP); Kouhei Gotou, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/954,481

(22) Filed: Oct. 1, 2004

(65) Prior Publication Data

US 2005/0078435 A1    Apr. 14, 2005

(30) Foreign Application Priority Data

Oct. 8, 2003    (JP) ............................. 2003-349072

(51) Int. Cl.
*H01G 9/00*    (2006.01)

(52) U.S. Cl. ..................... 361/525; 361/523; 252/500; 252/62.2

(58) Field of Classification Search ................ 361/523, 361/524, 525, 503, 504; 252/62.2, 500
See application file for complete search history.

(56) References Cited

U.S. PATENT DOCUMENTS

| | | | | |
|---|---|---|---|---|
| 5,187,649 A | * | 2/1993 | Kudoh et al. | 361/525 |
| 5,424,907 A | * | 6/1995 | Kojima et al. | 361/532 |
| 5,812,367 A | * | 9/1998 | Kudoh et al. | 361/523 |
| 6,162,563 A | * | 12/2000 | Miura et al. | 429/309 |
| 6,807,049 B2 | * | 10/2004 | Konuma et al. | 361/524 |

FOREIGN PATENT DOCUMENTS

| | | |
|---|---|---|
| JP | 60-37114 | 2/1985 |
| JP | 60-244017 | 12/1985 |
| JP | 2003-158043 | 5/2003 |

* cited by examiner

*Primary Examiner*—Anthony Dinkins
(74) *Attorney, Agent, or Firm*—Armstrong, Kratz, Quintos, Hanson & Brooks, LLP

(57) ABSTRACT

A solid electrolytic capacitor formed with a dielectric coating and a solid electrolyte layer successively formed on a surface of an anode body, wherein the solid electrolyte layer includes a conductive polymer containing at least a tetrahydronaphthalenesulfonate ion and a naphthalenesulfonate ion as dopants or a conductive polymer containing at least a tetrahydronaphthalenesulfonate ion and a benzenesulfonate ion as dopants. As a result, a solid electrolytic capacitor having a low ESR and a good heat resistance is provided.

8 Claims, 1 Drawing Sheet

SOLID ELECTROLYTIC CAPACITOR

BACKGROUND OF THE INVENTION

1. Field of the Invention

The present invention relates to a solid electrolytic capacitor using a conductive polymer as a solid electrolyte layer.

2. Description of the Background Art

In connection with size and weight reductions of electric equipment in recent years, a small capacitor of a large capacity for high frequencies, which has a low impedance in a high frequency region, has come to be required.

Though a mica capacitor, a film capacitor, a ceramic capacitor, and the like are used as capacitors for high frequencies, these capacitors are not suitable for large capacities.

On the other hand, an aluminum electrolytic capacitor, a tantalum electrolytic capacitor and the like are suitable for large capacities. Though a large capacity can be attained at low cost with the aluminum electrolytic capacitor, there are problems such as a change of electrolyte solution used over time because of evaporation and a high impedance at a high frequency.

Since the tantalum solid electrolytic capacitor uses solid manganese dioxide as an electrolyte, degradation in capacity of the capacitor is small. The solid electrolyte of the tantalum solid electrolytic capacitor, however, is formed by impregnation of sintered tantalum with aqueous solution of manganese nitrate followed by pyrolysis of manganese nitrate at about 350° C., which impregnation and pyrolysis steps usually have to be repeated for several to tens times. Therefore, considerable labor is required in formation process of the solid electrolyte. In addition, since a coating of manganese dioxide is deficient in self-repairing, there is a possibility of ignition or the like when a dielectric coating is damaged while a current is passed therethrough.

In order to solve problems mentioned above, use of a conductive polymer, which has a good electrical conductivity and is easily formed to be a solid electrolyte, as a solid electrolyte has been proposed recently (see Japanese Patent Laying-Open No. 60-037114 and No: 60-244017). With this technique, a solid electrolytic capacitor can be obtained which, in comparison with the solid electrolytic capacitor as described above, requires lower manufacturing cost, ensures a capacitance, has a dielectric coating that is not damaged, and has small leakage current.

The conductive polymer is formed by electrolytic polymerization of heterocyclic monomers such as pyrrole, thiophene and furan with a supporting electrolyte to form a film of polymer having a good conductivity on the dielectric coating using anion of the supporting electrolyte as a dopant. As the dopant of the conductive polymer, a halide such as a perchlorate ion or a boron tetrafluoride ion, a para-toluenesulfonate ion, a dodecylbenzenesulfonate ion, or the like is used.

For increasing reliability of such solid electrolytic capacitor, a decrease in an ESR (Equivalent Series Resistance) and an increase in a heat resistance are needed. A solid electrolytic capacitor using tetrahydronaphthalenesulfonic acid as a dopant of a conductive polymer has been proposed recently (see Japanese Patent Laying-Open No. 2003-158043).

Though tetrahydronaphthalenesulfonic acid is highly effective in decreasing the ESR, as it has low heat resistance, the solid electrolytic capacitor using tetrahydronaphthalenesulfonic acid as a dopant has the ESR which is low before a reflow but is increased after the reflow.

SUMMARY OF THE INVENTION

An object of the present invention is to provide a solid electrolytic capacitor which solves the above-described problems and has a low ESR and a good heat resistance.

To attain the object described above, a solid electrolytic capacitor according to one aspect of the present invention is a solid electrolytic capacitor formed with a dielectric coating and a solid electrolyte layer successively formed on a surface of an anode body, wherein the solid electrolyte layer includes a conductive polymer containing at least a tetrahydronaphthalenesulfonate ion expressed as a general formula (1)

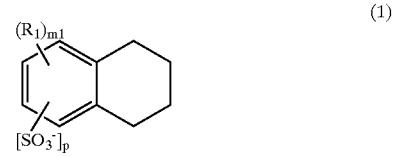

(in the formula, m1 represents an integer not less than 0, p represents an integer not less than 1, and $R_1$ represents an alkyl group having a carbon number of 1–20) and a naphthalenesulfonate ion expressed as a general formula (2)

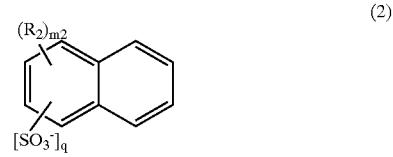

(in the formula, m2 represents an integer not less than 0, q represents an integer not less than 1, and $R_2$ represents an alkyl group having a carbon number of 1–20. This formula includes any naphthalenesulfonate ion having an alkyl group and a sulfonate ion group each substituting for a hydrogen atom in at least one of aromatic rings) as dopants.

In addition, a solid electrolytic capacitor according to another aspect of the present invention is a solid electrolytic capacitor formed with a dielectric coating and a solid electrolyte layer successively formed on a surface of an anode body, wherein the solid electrolyte layer includes a conductive polymer containing at least a tetrahydronaphthalenesulfonate ion expressed as the aforementioned general formula (1) and a benzenesulfonate ion expressed as a general formula (3)

(in the formula, m3 represents an integer not less than 0, r represents an integer not less than 1, and $R_3$ represents an alkyl group having a carbon number of 1–20) as dopants.

In the solid electrolytic capacitor according to any of the above-described aspects of the present invention, a ratio of the tetrahydronaphthalenesulfonate ion can be 40 mol % to 80 mol % of a total amount of the dopants. In addition, the conductive polymer can be polypyrrole. Furthermore, the tetrahydronaphthalenesulfonate ion can be a butyltetrahydronaphthalenesulfonate ion.

According to the present invention, a solid electrolytic capacitor having a low ESR and a good heat resistance can be provided by combining at least the tetrahydronaphthalenesulfonate ion and the naphthalenesulfonate ion or the benzenesulfonate ion as dopants.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
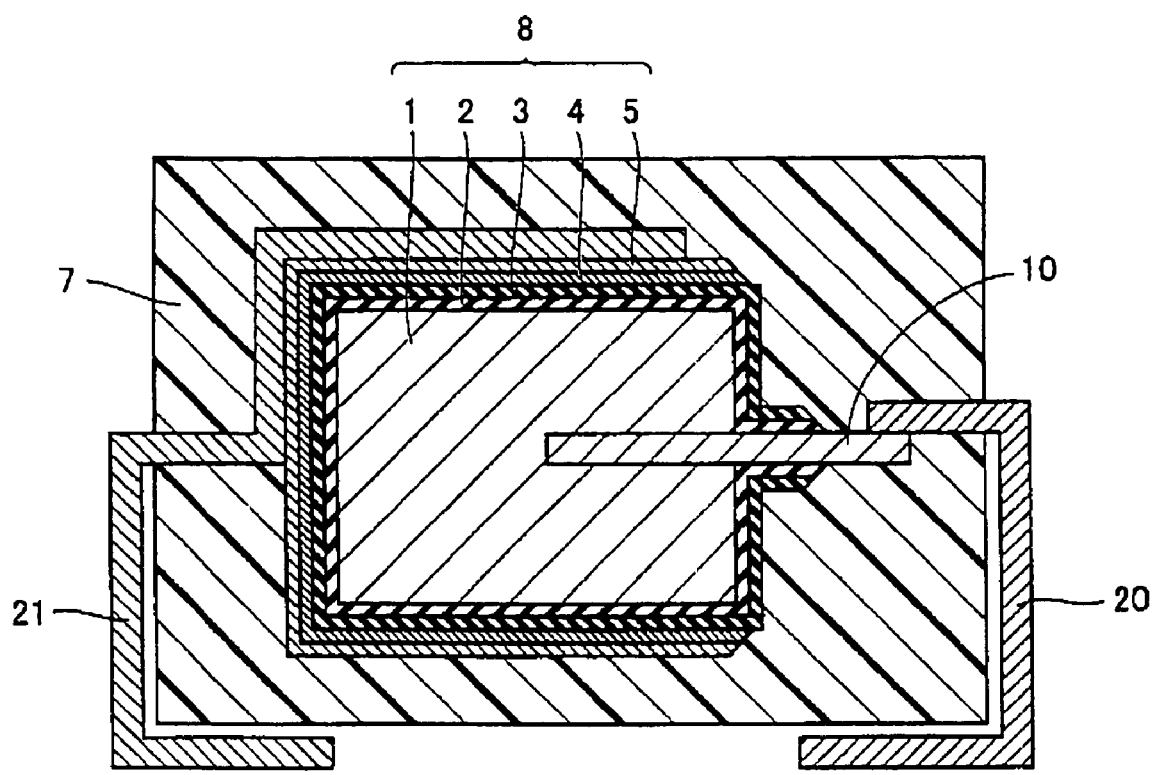
FIG. 1 is a schematic cross-sectional view of a solid electrolytic capacitor according to the present invention.

Referring to FIG. 1, a solid electrolytic capacitor according to the present invention is a solid electrolytic capacitor formed with a dielectric coating 2 and a solid electrolyte layer 3 successively formed on a surface of an anode body 1, wherein solid electrolyte layer 3 includes a conductive polymer containing at least a tetrahydronaphthalenesulfonate ion expressed as a general formula (1)

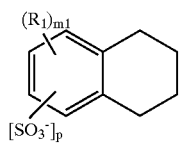

(1)

and a naphthalenesulfonate ion expressed as a general formula (2) as dopants.

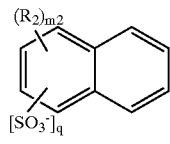

(2)

In general formula (1), m1 represents an integer not less than 0 and p represents an integer not less than 1. In addition, $R_1$ represents an alkyl group having a carbon number of 1–20. A tetrahydronaphthalenesulfonate ion including at least one alkyl group ($R_1$ group) (m1≧1) has stronger emulsification property to the conductive polymer and is more soluble as compared with a tetrahydronaphthalenesulfonate ion including no alkyl group ($R_1$ group) (m1=0). A heat resistance tends to decrease if the carbon number of the alkyl group ($R_1$ group) is larger than 20. When two or more alkyl groups ($R_1$ groups) are included, carbon numbers of respective alkyl groups ($R_1$ groups) may be different from each other, or may be the same.

Specific examples of the tetrahydronaphthalenesulfonate ion expressed as general formula (1) include a tetrahydronaphthalenemonosulfonate ion, a tetrahydronaphthalenedisulfonate ion, a monobutyltetrahydronaphthalenemonosulfonate ion, a monobutyltetrahydronaphthalenedisulfonate ion, a diisopropyltetrahydronaphthalenemonosulfonate ion, and a dinonyltetrahydronaphthalenemonosulfonate ion. As to effects of a decrease in an ESR and an increase in a heat resistance of the solid electrolytic capacitor, there is little difference if the tetrahydronaphthalenesulfonate ion is a mono-, di- or tri-compound of a sulfonate ion group ($[SO_3^-]$ group), has no alkyl group ($R_1$ group) or is a mono-, di- or tri-compound of the alkyl group ($R_1$ group). Thus, any such compound or a mixture thereof may be used.

In general formula (2), m2 represents an integer not less than 0 and q represents an integer not less than 1. In addition, $R_2$ represents an alkyl group having a carbon number of 1–20. A naphthalenesulfonate ion including at least one alkyl group ($R_2$ group) (m2≧1) has stronger emulsification property to the conductive polymer and is more soluble as compared with a naphthalenesulfonate ion including no alkyl group ($R_2$ group) (m2=0). A heat resistance tends to decrease if the carbon number of the alkyl group ($R_2$ group) is larger than 20. When two or more alkyl groups ($R_2$ groups) are included, carbon numbers of respective alkyl groups ($R_2$ groups) may be different from each other, or may be the same. In addition, each of the alkyl group ($R_2$ group) and the sulfonate ion group ($[SO_3^-]$ group) can substitute for a hydrogen atom in either aromatic ring of a naphthalene ring. That is, general formula (2) includes any naphthalenesulfonate ion having the alkyl group ($R_2$ group) and the sulfonate ion group ($[SO_3^-]$ group) each substituting for a hydrogen atom in at least one of the aromatic rings.

Specific examples of the naphthalenesulfonate ion expressed as general formula (2) include a naphthalenemonosulfonate ion, a naphthalenedisulfonate ion, a monomethylnaphthalenemonosulfonate ion, a dimethylnaphtalenemonosulfonate ion, a dimethylnaphthalenedisulfonate ion, a monobutylnaphthalenemonosulfonate ion, a dibutylnaphthalenemonosulfonate ion, and a dibutylnaphthalenedisulfonate ion. As to effects of a decrease in an ESR and an increase in a heat resistance of the solid electrolytic capacitor, there is little difference if the naphthalenesulfonate ion is a mono-, di- or tri-compound of the sulfonate ion group ($[SO_3^-]$ group), has no alkyl group ($R_2$ group) or is a mono-, di- or tri-compound of the alkyl group ($R_2$ group). Thus, any such compound or a mixture thereof may be used.

By containing the tetrahydronaphthalenesulfonate ion and the naphthalenesulfonate ion as dopants of the conductive polymer, a heat resistance of the solid electrolytic capacitor is increased and a low ESR can be maintained even after a reflow. The reflow implies that an electronic component such as a capacitor is soldered to a board by application of heat. The low ESR after the reflow means that the capacitor has high heat resistance.

Referring back to FIG. 1, another solid electrolytic capacitor according to the present invention is a solid electrolytic capacitor formed with dielectric coating 2 and solid electrolyte layer 3 successively formed on a surface of anode body 1, wherein solid electrolyte layer 3 includes a conductive polymer containing at least a tetrahydronaphthalenesulfonate ion expressed as the above-described general formula (1) and a benzenesulfonate ion expressed as a general formula (3) as dopants.

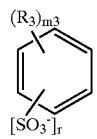

(3)

In general formula (3), m3 represents an integer not less than 0 and r represents an integer not less than 1. In addition, $R_3$ represents an alkyl group having a carbon number of 1–20. A benzenesulfonate ion including at least one alkyl group ($R_3$ group) (m3≧1) has stronger emulsification property to the conductive polymer and is more soluble as compared with a benzenesulfonate ion including no alkyl group ($R_3$ group) (m3=0). A heat resistance tends to decrease if the carbon number of the alkyl group ($R_3$ group) is larger than 20. When two or more alkyl groups ($R_3$ groups) are included, carbon numbers of respective alkyl groups ($R_3$ groups) may be different from each other, or may be the same.

Specific examples of the benzenesulfonate ion expressed as general formula (3) include a benzenemonosulfonate ion, a benzenedisulfonate ion, a monododecylbenzenemonosulfonate ion, a monododecylbenzenedisulfonate ion, a monooctylbenzenemonosulfonate ion, and a dioctylbenzenemonosulfonate ion. As to effects of a decrease in an ESR and an increase in a heat resistance of the solid electrolytic capacitor, there is little difference if the benzenesulfonate ion is a mono-, di- or tri-compound of the sulfonate ion group ([$SO_3^-$] group), has no alkyl group ($R_3$ group) or is a mono-, di- or tri-compound of the alkyl group ($R_3$ group). Thus, any such compound or a mixture thereof may be used.

By containing the tetrahydronaphthalenesulfonate ion and the benzenesulfonate ion as dopants of the conductive polymer, a heat resistance of the solid electrolytic capacitor is increased and a low ESR can be maintained even after a reflow.

In the present invention, a ratio of the tetrahydronaphthalenesulfonate ion is preferably 40 mol % to 80 mol % of a total amount of the dopants. With 40 mol % to 80 mol % of the tetrahydronaphthalenesulfonate ion, a multiplier effect of a combination of the tetrahydronaphthalenesulfonate ion and the naphthalenesulfonate ion or a combination of the tetrahydronaphthalenesulfonate ion and the benzenesulfonate ion is increased, and thus the ESR before the reflow becomes low while the heat resistance increases, which allows a low ESR after the reflow. From this standpoint, the ratio of the tetrahydronaphthalenesulfonate ion is preferably 50 mol % to 70 mol % of a total amount of the dopants. The tetrahydronaphthalenesulfonate ion expressed as general formula (1) has a low ESR before the reflow and a low heat resistance, while the naphthalenesulfonate ion expressed as general formula (2) or the benzenesulfonate ion expressed as general formula (3) has a high ESR before the reflow and a high heat resistance.

Though the conductive polymer used in the present invention is not specifically limited, a conductive polymer having a heterocycle such as polypyrrole, polythiophene or polyaniline is preferably used. Polypyrrole is especially preferable because a solid electrolyte layer of high quality is formed with electrolytic polymerization.

The solid electrolytic capacitor has a structure such that, as shown in FIG. 1, on a surface of anode body 1 including a sintered valve metal such as tantalum, niobium, titanium, or aluminum, dielectric coating 2 formed by oxidization of the surface of anode body 1, solid electrolyte layer 3, a carbon layer 4 containing conductive carbon, and a cathode extraction layer 5 including silver paste are successively formed to construct a capacitor element 8, an anode terminal 20 is connected to an anode lead member 10 inserted into anode body 1 from one end surface thereof, a cathode terminal 21 is connected to cathode extraction layer 5, and a capacitor element 8 formed as described above is covered and sealed with an exterior resin 7 such as an epoxy resin.

The solid electrolytic capacitor according to the present invention will be described more specifically based on examples. In the following examples and comparative examples, each sulfonate ion used had a mono-compound as to the sulfonate ion group or the alkyl group as a main component. Thus, a prefix "mono-" is omitted in the following descriptions of names of sulfonate ions or sulfonates in the examples and comparative examples.

EXAMPLE 1

Referring to FIG. 1, for anode body 1 of a rectangular parallelepiped of 4.36 mm×3.26 mm×0.90 mm formed with sintered tantalum (Ta), having anode lead member 10 inserted thereto from one end surface thereof (a 3.26 mm×0.90 mm surface), anodic oxidation was performed in aqueous solution of phosphoric acid to form dielectric coating 2 on a surface thereof, and electrolytic polymerization was performed using a polymerization solution described below to form solid electrolyte layer 3 on dielectric coating 2. Then, carbon layer 4 and cathode extraction layer 5 were successively formed on solid electrolyte layer 3 to form capacitor element 8. Furthermore, anode terminal 20 was welded to anode lead member 10 and cathode terminal 21 was connected to cathode extraction layer 5 with a conductive adhesive, and thereafter, an outer surface of capacitor element 8 was covered and sealed with exterior resin 7 formed with an epoxy resin to make a solid electrolytic capacitor.

For forming the solid electrolyte layer, the polymerization solution prepared by adding pyrrole (0.2 M: a molarity to the whole solution, which is the same as below) for forming the conductive polymer and sodium butyltetrahydronaphthalenesulfonate (0.1 M) and sodium butylnaphthalenesulfonate (0.1 M) as dopants to water as a solvent was used. In the polymerization solution, sodium butyltetrahydronaphthalenesulfonate is dissociated to a butyltetrahydronaphthalenesulfonate ion and a sodium ion, while sodium butylnaphthalenesulfonate is dissociated to a butylnaphthalenesulfonate ion and a sodium ion, and the butyltetrahydronaphthalenesulfonate ion and the butylnaphthalenesulfonate ion are incorporated into polypyrrole as dopants during the polymerization to form the solid electrolyte layer. The manner is similar for other sodium sulfonates. A sulfonate compound as a material of the dopant is not specifically limited provided that it can be dissociated to a sulfonate ion and a counterion thereof in the polymerization solution, which can be sulfonic acid, potassium sulfonate, ammonium sulfonate or the like besides sodium sulfonate mentioned above.

An ESR of the solid electrolytic capacitor obtained as above was measured and, after reflowing the solid electrolytic capacitor, the ESR was measured again. A method and a condition of the reflow included four steps as follows. A temperature was increased to 150° C. within 60 seconds in a first step, held at 150° C. for at most 120 seconds in a second step, increased from 150° C. to 200° C. within 30 seconds in a third step, and then increased from 200° C. to 250° C., held at 250° C. for at most 5 seconds, and decreased from 250° C. to 200° C. within 40 seconds in a fourth step. Table 1 shows the ESRs of the solid electrolytic capacitor before and after the reflow.

EXAMPLES 2 AND 3, COMPARATIVE EXAMPLES 1–4

Solid electrolytic capacitors were formed as described in example 1 except that compounds having molarities as shown in Table 1 were used as polymerization solutions of electrolytic polymerization, and the ESRs before and after the reflow were measured as in example 1. The results are shown in Table 1.

thalenesulfonate ion (hereafter referred to as MN) or a dodecylbenzenesulfonate ion (hereafter referred to as DB) as a dopant has a high heat resistance, it has a high ESR after the reflow because of the high ESR before the reflow.

In contrast, as shown in examples 1–3 in Table 1, a solid electrolytic capacitor using BTHN and BN, MN or DB combined in an equal mol ratio as dopants respectively had the ESRs before and after the reflow of 12.2 mΩ and 13.4 mΩ, 16.2 mΩ and 18.1 mΩ, or 15.4 mΩ and 19.2 mΩ. This showed that the heat resistance of the solid electrolytic capacitor is increased and the low ESR can be maintained

TABLE 1

|  | Conductive Monomer (Molarity) | Dopant (Molarity) | | Dopant (Mol %) | ESR Before Reflow (mΩ) | ESR After Reflow (mΩ) |
|---|---|---|---|---|---|---|
| Example 1 | Pyrrole (0.2) | BTHN (0.1) | BN (0.1) | BTHN (50) BN (50) | 12.2 | 13.4 |
| Example 2 | Pyrrole (0.2) | BTHN (0.1) | MN (0.1) | BTHN (50) BN (50) | 16.2 | 18.1 |
| Example 3 | Pyrrole (0.2) | BTHN (0.1) | DB (0.1) | BTHN (50) BN (50) | 15.4 | 19.2 |
| Comparative Example 1 | Pyrrole (0.2) | BTHN (0.2) | | | 11.7 | 21.7 |
| Comparative Example 2 | Pyrrole (0.2) | | BN (0.2) | | 18.8 | 20.4 |
| Comparative Example 3 | Pyrrole (0.2) | | MN (0.2) | | 20.1 | 22.6 |
| Comparative Example 4 | Pyrrole (0.2) | | DB (0.2) | | 17.2 | 25.4 |

BTHN: butyltetrahydronaphthalenesulfonate ion
BN: butylnaphthalenesulfonate ion
MN: methylnaphthalenesulfonate ion
DB: dodecylbenzenesulfonate ion As shown in a comparative example 1 in Table 1, though a solid electrolytic capacitor using only a butyltetrahydronaphthalenesulfonate ion (hereafter referred to as BTHN) as a dopant had the ESR as low as 11.7 mΩ before the reflow, the ESR after the reflow was increased to 21.7 mΩ, which shows that it has a low heat resistance. In addition, as shown in comparative examples 2–4, though a solid electrolytic capacitor using only a butylnaphthalenesulfonate ion (hereafter referred to as BN), a methylnaphafter the reflow by combining BTHN and BN, MN or DB as dopants.

EXAMPLES 4–8

Solid electrolytic capacitors were formed as described in example 1 except that compounds having molarities as shown in Table 2 were used as polymerization solutions of electrolytic polymerization, and the ESRs before and after the reflow were measured as in example 1. The results are shown in Table 2.

TABLE 2

|  | Conductive Monomer (Molarity) | Dopant (Molarity) | | Dopant (Mol %) | ESR Before Reflow (mΩ) | ESR After Reflow (mΩ) |
|---|---|---|---|---|---|---|
| Example 4 | Pyrrole (0.2) | BTHN (0.02) | BN (0.18) | BTHN (10) BN (90) | 17.5 | 19.7 |
| Example 5 | Pyrrole (0.2) | BTHN (0.06) | BN (0.14) | BTHN (30) BN (70) | 15.8 | 17.3 |
| Example 6 | Pyrrole (0.2) | BTHN (0.1) | BN (0.1) | BTHN (50) BN (50) | 12.2 | 13.4 |
| Example 7 | Pyrrole (0.2) | BTHN (0.14) | BN (0.06) | BTHN (70) BN (30) | 12.1 | 14.8 |
| Example 8 | Pyrrole (0.2) | BTHN (0.18) | BN (0.02) | BTHN (90) BN (10) | 11.9 | 18.2 |

BTHN: butyltetrahydronaphthalenesulfonate ion
BN: butylnaphthalenesulfonate ion

As shown in examples 6 and 7 in Table 2, a solid electrolytic capacitor using BTHN and BN in a mol ratio of 5:5 or 7:3 in dopants maintained low ESRs before and after the reflow such as 12.2 mΩ and 13.4 mΩ or 12.1 mΩ and 14.8 mΩ, respectively. This shows that a ratio of BTHN is preferably 40 mol % to 80 mol %, and more preferably 50 mol % to 70 mol % of a total amount of the dopants.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor formed with a dielectric coating and a solid electrolyte layer successively formed on a surface of an anode body; wherein
    said solid electrolyte layer includes a conductive polymer containing at least
    a tetrahydronaphthalenesulfonate ion expressed as a general formula (1)

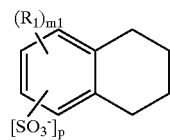

(1)

(in the formula, m1 represents an integer not less than 0, p represents an integer not less than 1, and $R_1$ represents an alkyl group having a carbon number of 1–20) and
a naphthalenesulfonate ion expressed as a general formula (2)

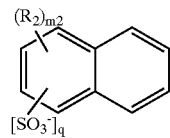

(2)

(in the formula, m2 represents an integer not less than 0, q represents an integer not less than 1, and $R_2$ represents an alkyl group having a carbon number of 1–20, and the formula includes any naphthalenesulfonate ion having an alkyl group and a sulfonate ion group each substituting for a hydrogen atom in at least one of aromatic rings)
as dopants.

2. The solid electrolytic capacitor according to claim 1, wherein
    a ratio of the tetrahydronaphthalenesulfonate ion is 40 mol % to 80 mol % of a total amount of the dopants.

3. The solid electrolytic capacitor according to claim 1, wherein
    the conductive polymer is polypyrrole.

4. The solid electrolytic capacitor according to claim 1, wherein
    the tetrahydronaphthalenesulfonate ion is a butyltetrahydronaphthalenesulfonate ion.

5. A solid electrolytic capacitor formed with a dielectric coating and a solid electrolyte layer successively formed on a surface of an anode body; wherein
    said solid electrolyte layer includes a conductive polymer containing at least
    a tetrahydronaphthalenesulfonate ion expressed as a general formula (1)

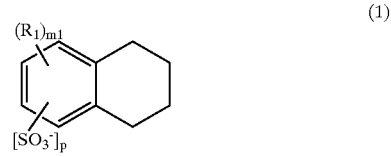

(1)

(in the formula, m1 represents an integer not less than 0, p represents an integer not less than 1, and $R_1$ represents an alkyl group having a carbon number of 1–20) and
a benzenesulfonate ion expressed as a general formula (3)

(3)

(in the formula, m3 represents an integer not less than 0, r represents an integer not less than 1, and $R_3$ represents an alkyl group having a carbon number of 1–20)
as dopants.

6. The solid electrolytic capacitor according to claim 5, wherein
    a ratio of the tetrahydronaphthalenesulfonate ion is 40 mol % to 80 mol % of a total amount of the dopants.

7. The solid electrolytic capacitor according to claim 5, wherein
    the conductive polymer is polypyrrole.

8. The solid electrolytic capacitor according to claim 5, wherein
    the tetrahydronaphthalenesulfonate ion is a butyltetrahydronaphthalenesulfonate ion.

* * * * *